United States Patent
Greiner-Perth et al.

(10) Patent No.: US 10,173,815 B2
(45) Date of Patent: Jan. 8, 2019

(54) DISCHARGE HEAD FOR A FLUID DISPENSER AND FLUID DISPENSER

(71) Applicants: Juergen Greiner-Perth, Gottmadingen (DE); Pia Meinel, Constance (DE); Guenter Nadler, Moos-Iznang (DE)

(72) Inventors: Juergen Greiner-Perth, Gottmadingen (DE); Pia Meinel, Constance (DE); Guenter Nadler, Moos-Iznang (DE)

(73) Assignee: APTAR RADOLFZELL GMBH, Radolfzell (DE)

( * ) Notice: Subject to any disclaimer, the term of this patent is extended or adjusted under 35 U.S.C. 154(b) by 0 days.

(21) Appl. No.: 15/244,512

(22) Filed: Aug. 23, 2016

(65) Prior Publication Data
US 2017/0057710 A1 Mar. 2, 2017

(30) Foreign Application Priority Data
Aug. 24, 2015 (EP) .................................. 15182116

(51) Int. Cl.
*B65D 47/26* (2006.01)
*B65D 50/00* (2006.01)
(Continued)

(52) U.S. Cl.
CPC .............. *B65D 47/266* (2013.01); *A61J 1/14* (2013.01); *B05B 11/0029* (2013.01);
(Continued)

(58) Field of Classification Search
CPC .............. B65D 47/266; B65D 47/2031; B65D 47/263; B65D 47/283; B65D 50/00;
(Continued)

(56) References Cited

U.S. PATENT DOCUMENTS

| 4,506,809 A | * | 3/1985 | Corsette | B65D 47/2081 137/493 |
| 4,544,063 A | | 10/1985 | Neward | |

(Continued)

FOREIGN PATENT DOCUMENTS

| DE | 10 2013 202 933 B3 | 11/2013 |
| DE | 10 2013 107 439 A1 | 1/2015 |
| WO | WO 98/04471 A1 | 2/1998 |

OTHER PUBLICATIONS

Examination Report of European Patent Office issued in Application No. EP 15182116 with English translation of category of cited documents dated Mar. 10, 2016 (7 pages).

*Primary Examiner* — Frederick C Nicolas
(74) *Attorney, Agent, or Firm* — Flynn Thiel, P.C.

(57) ABSTRACT

A discharge head for a fluid container, including a discharge opening and a switching valve which closes and opens a fluid path between the fluid container and the discharge opening. The discharge head has an inner component fixedly connected to a fluid store and an outer component movable relative to the inner component and non-separably connected thereto. The outer component is moved relative to the inner component between a first relative closure position and a second relative open position. The switching valve is opened and closed by movement of the inner component relative to the outer component, is closed in the first position and open in the second position. The inner and outer components are locked in the first position by a child-resistant mechanism, and displacement of the outer component from the first position into the second position is prevented in a locking position of the mechanism.

13 Claims, 6 Drawing Sheets

(51) Int. Cl.
*A61J 1/14* (2006.01)
*G01F 19/00* (2006.01)
*B05B 11/00* (2006.01)
*B05B 11/04* (2006.01)
*B65D 47/28* (2006.01)
*B65D 50/04* (2006.01)
*B65D 47/20* (2006.01)

(52) U.S. Cl.
CPC .......... *B05B 11/04* (2013.01); *B65D 47/2031* (2013.01); *B65D 47/263* (2013.01); *B65D 47/283* (2013.01); *B65D 50/00* (2013.01); *B65D 50/04* (2013.01); *B65D 50/046* (2013.01); *G01F 19/002* (2013.01); *B05B 11/0059* (2013.01)

(58) Field of Classification Search
CPC ... B65D 50/04; B65D 50/046; B05B 11/0029; B05B 11/04; B05B 11/0059; A61J 1/14; G01F 19/002
See application file for complete search history.

(56) References Cited

U.S. PATENT DOCUMENTS

| | | | | |
|---|---|---|---|---|
| 4,561,570 | A * | 12/1985 | Zulauf | B65D 47/2031 222/153.14 |
| 4,785,978 | A * | 11/1988 | Kano | B05B 11/047 215/309 |
| 6,446,844 | B1 * | 9/2002 | Gross | B65D 47/2031 222/212 |
| 6,543,652 | B1 * | 4/2003 | Kelder | B65D 47/2037 222/212 |
| 6,695,173 | B1 * | 2/2004 | Fontana | B65D 47/2068 222/206 |
| 2011/0163132 | A1 | 7/2011 | Moreau | |

* cited by examiner

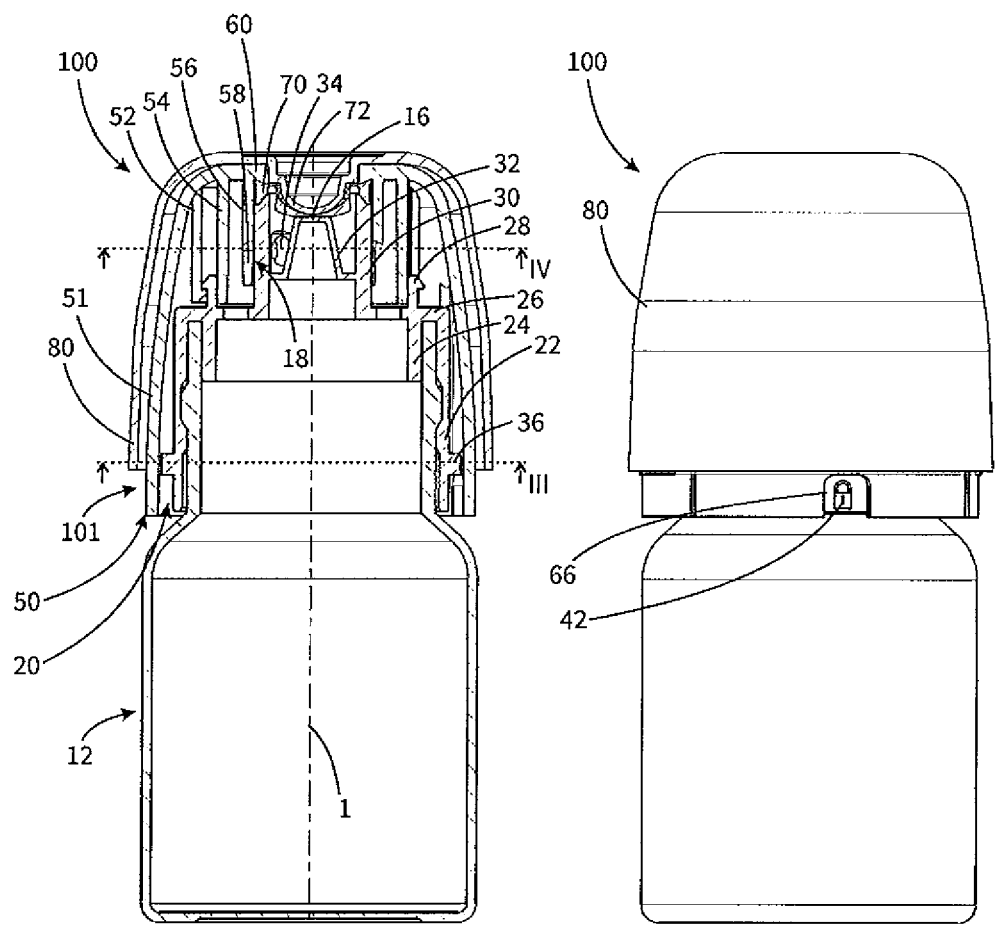
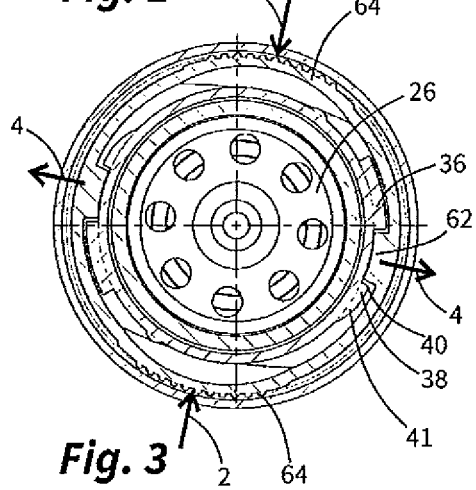
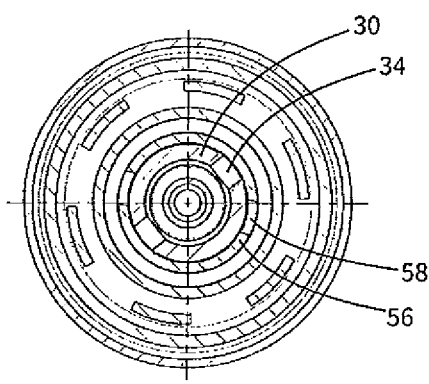

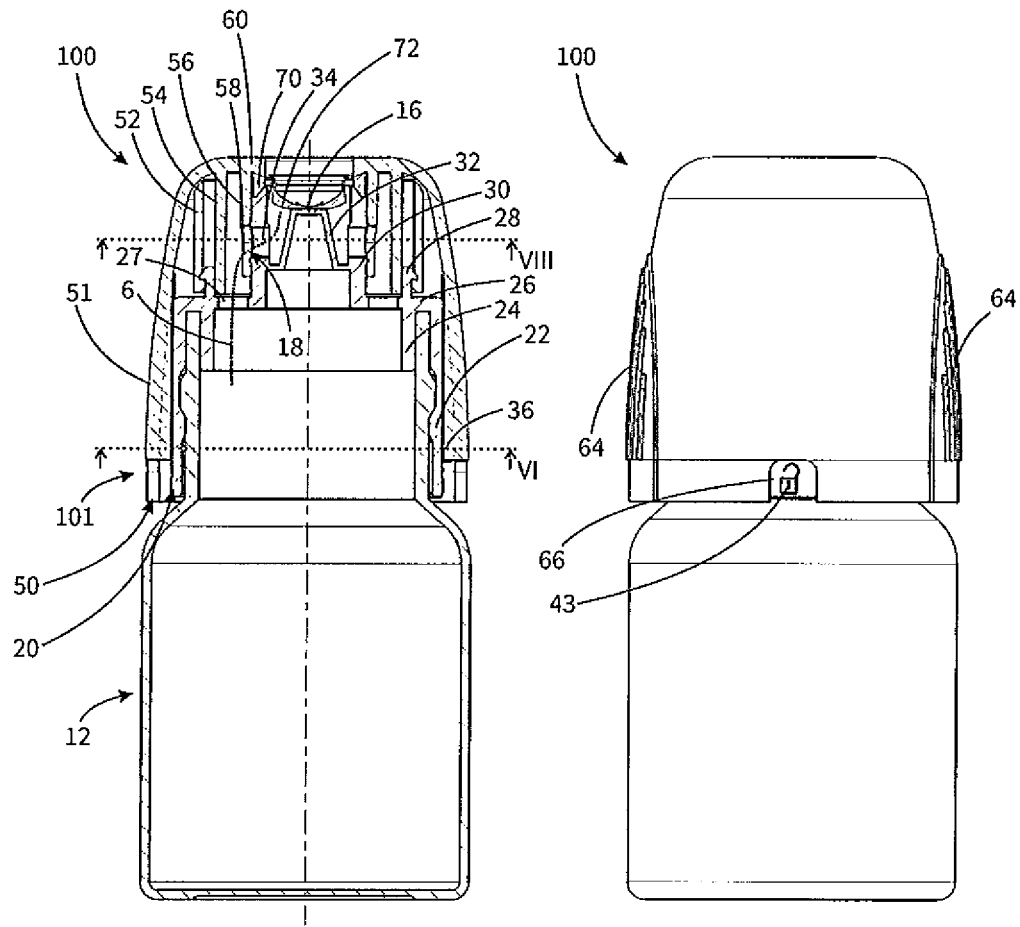
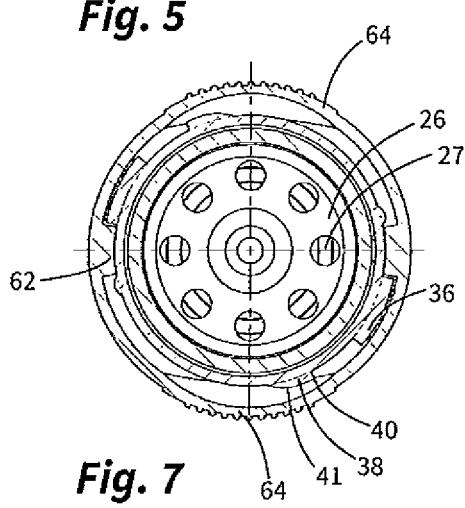
Fig. 5
Fig. 6
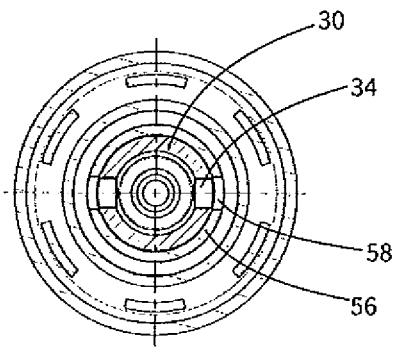
Fig. 7
Fig. 8

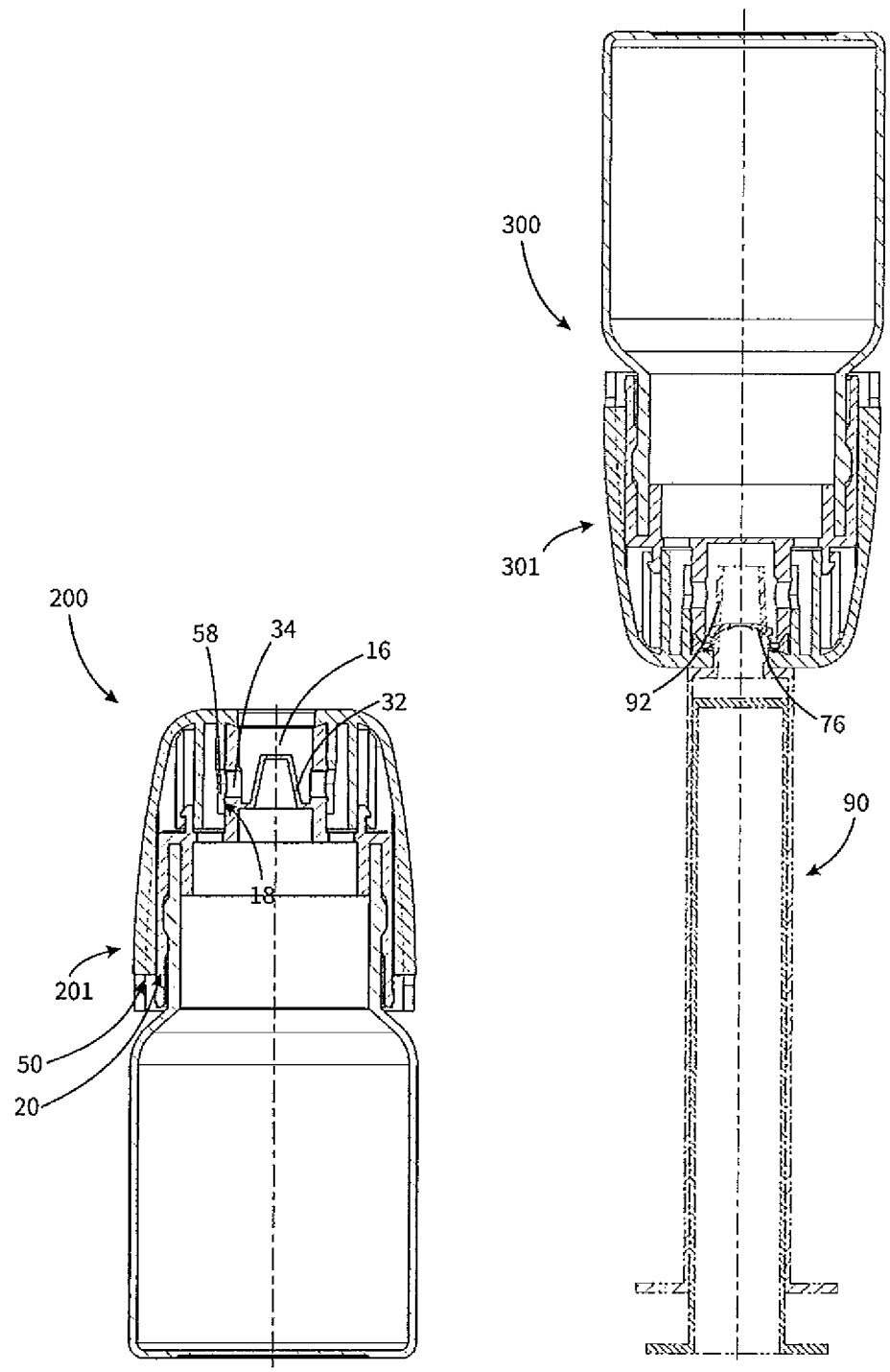

DISCHARGE HEAD FOR A FLUID DISPENSER AND FLUID DISPENSER

CROSS-REFERENCE TO RELATED APPLICATIONS

This claims priority from European Patent Application No. 15182116.2, filed on Aug. 24, 2015, the disclosure of which is hereby incorporated by reference in its entirety into this application.

FIELD OF APPLICATION AND PRIOR ART

The invention relates to a discharge head for a fluid dispenser and to a fluid dispenser.

It is already known from the prior art to protect fluid dispensers so that children cannot readily discharge the content thereof. To this end, for example, it is known to provide fluid dispensers with caps which can be removed only by means of a particular application of force or movement sequences. It is also known to secure actuating handles by means of which a pump of a fluid dispenser can be actuated in order to allow discharge only after a selective release of the securing action. Different child-resistant fluid dispensers are known, for example, from DE 10 2013 202 933 B3.

Such child-resistance is particularly desirable for fluid dispensers for medical/pharmaceutical purposes. In those cases, it is particularly important that children do not reach the content in these dispensers.

Problem and Solution

An object of the invention is to provide a structurally comparatively simple child-resistance, in particular for the fluid dispensers which discharge fluid in an inverted position and/or by application of force to a squeezable bottle. Another object of the invention is to provide a corresponding discharge head for a fluid dispenser.

The discharge head according to the invention is configured to be fitted to a fluid container so that the discharge head and fluid container together form a fluid dispenser. The discharge head has a discharge opening and a switching valve which, in the closed state, closes a fluid path from the fluid container to the discharge opening and, in the open state, opens that fluid path. The discharge head has an inner component which is fixedly connected to the fluid store and an outer component which is movably provided on the inner component and which is connected to the inner component in a non-separable manner, wherein the outer component can be moved relative to the inner component between a first relative position and a second relative position. The switching valve can be opened and closed by a relative movement of the inner component with respect to the outer component, wherein it is closed in the first relative position and is open in the second relative position.

The inner component and the outer component can be locked in the first relative position by a child-resistant mechanism which acts in a positive-locking manner and which can be switched over repeatedly between a locking position and a release position, wherein a relative displacement of the outer component from the first relative position into the second relative position is prevented in the locking position.

A discharge head according to the invention has at least two components, that is to say, the inner component mentioned and the outer component mentioned. Integral components or components comprising a plurality of partial components which are joined to each other in a non-movable manner may be involved. The components are preferably plastics components. The inner component and the outer component are connected to each other in a non-separable manner, by which it is intended to be understood that during correct use those two components always remain connected, that is to say, in particular neither of the two components is completely removed in the manner of a cap or the like.

Nevertheless, in a configuration according to the invention the inner component and the outer component are movable relative to each other. As a result of the relative movement of the outer component relative to the inner component, the switching valve provided on the discharge head can be opened and closed. If the inner component and the outer component are located in the first relative position thereof (closure position), a fluid path between an inlet side of the discharge head and the discharge opening is closed. If they are in the second relative position (open position), that fluid path is open and fluid can be discharged, where applicable with slight application of pressure to overcome an additional outlet valve which will be explained in greater detail below.

The discharge head is provided with the mentioned child-resistant mechanism. That child-resistant mechanism acts in that the movement of the inner component and the outer component from the first relative position (closure position) into the second relative position (open position) is prevented if the child-resistant mechanism is located in the locking position thereof. The initial state is reached only by moving the child-resistant mechanism into the release position, which movement is intended to be correctly carried out by an adult, in order to be able to produce a relative displacement of the outer component relative to the inner component into the second relative position.

Various variants are conceivable for the relative movability of the outer component relative to the inner component. The outer component may be rotatable relative to the inner component between the first relative position and the second relative position about a rotation axis and/or be displaceable in a translational manner between the first relative position and the second relative position.

The outer component can consequently be supported on the inner component in a purely rotationally movable manner without an ability to be displaced being provided in an axial direction. It is also possible to provide a purely linear translational ability to move, by means of which the inner component and outer component are displaced relative to each other. Furthermore, combinations are also conceivable, such as, for example, a superimposed relative movability, as is the case with a screw thread, or a multi-phase relative movability, as is conventional in a bayonet type connection.

In accordance with the type of relative movability, various configurations of the switching valve are particularly advantageous. This is explained in greater detail below.

The discharge head may have an outlet valve which opens in a pressure-dependent manner in the case of inner pressure which is higher than the ambient pressure upstream or downstream of the switching valve.

That additional valve results in free discharge of the fluid not yet being possible simply by opening the switching valve. In addition, it is necessary to apply pressure, as possible, for example, by compressing a squeezable bottle. In addition to the better ability of the discharge operation to be metered, this results in an increased level of safety with respect to undesirable discharge by a child. Particularly when the fluid dispenser is intended to be used in an inverted position, such an additional valve is advantageous.

The outlet valve may be formed by a resiliently redirectable valve component, in which the discharge opening is provided and is opened by the valve component being deformed in the case of fluid pressure being applied. The valve component may have at the outer side a peripheral fixing portion which is fixed to the inner component or the outer component, or which is fixed between the inner component and the outer component.

This arrangement of the valve component results in great structural simplicity. The valve component is in this case an integral component comprising a resiliently deformable material, such as, for example, an elastomer material. It itself has the discharge opening, for example, in the form of a simple slot or a cross slot. As a result of the deformation of the component as a result of pressure, this discharge opening is opened and the discharge can be produced. In particular as a result of the valve component being fixed between the inner component and the outer component, simple assembly and cost-effective configuration are possible. If the inner component and the outer component are moved relative to each other in accordance with provisions in a translational manner, fixing the valve component to the outer component is advantageous. Thus, the outer component may comprise, for example, two individual members which are pressed together or engaged with each other and between which the peripheral fixing portion of the valve component can be clamped.

The child-resistant mechanism may have on the inner component and the outer component stop faces which prevent a rotational and/or a translational movement starting from the first relative position and which can be uncoupled from each other by radial displacement of one of the stop faces.

A relative movement of the inner component and the outer component is accordingly prevented by means of the stop faces which abut each other and which are moved out of engagement with each other when the child resistant mechanism is moved into the release position. To this end, at least one stop face is preferably radially displaced.

The outer component may be deformable in the first relative position with respect to the inner component by manual application of force so that the stop face on the outer component moves out of engagement with the stop face on the inner component.

The displacement of the stop face by deformation of the outer component allows what physical force is necessary to be readily fixed as a result of the wall thicknesses of the outer component. Furthermore, it is difficult for a child to understand that the outer component which is moved for the purpose of the relative displacement with respect to the inner component was further deformed directly before that relative movement as a result of application of force in order to overcome the child resistant action. Since the outer component is preferably constructed from a plastics material which again takes up the original shape thereof after the application of force has ended, there is no risk that the child-resistant mechanism may remain in the released state inadvertently after the fluid has been discharged. The manual return movement of the outer component and the inner component into the first relative position thereof (closure position) may automatically bring the child-resistant mechanism into the locking position thereof again in the case of such a construction.

The outer component and the inner component may be fitted to each other in a rotationally and axially non-movable manner. The switching valve may in such a case have a radially orientated fluid outlet in the inner component and a radially orientated fluid outlet in the outer component, wherein in the first relative position the fluid outlets are offset relative to each other in a peripheral direction so that the switching valve is closed, and wherein in the second relative position the fluid outlets are aligned with each other so that the switching valve is open.

For this purpose, the inner component and the outer component preferably have walls which are fitted one in the other in a shell-like manner and through which the respective fluid outlets extend. Those walls may be constructed, for example, to be cylindrical or conical. In the first relative position of the inner component and the outer component, the fluid outlets are not aligned so that the switching valve is closed and a discharge of fluid is impossible.

The outer component and the inner component may be fitted to each other in a translationally movable manner with respect to a relative movement direction. The switching valve may then have in the inner component a fluid outlet which can be opened or closed with respect to the outer component by a closure face on the outer component following the relative translational movement of the inner component, or the switching valve may have in the outer component a fluid outlet which can be opened or closed with respect to the outer component by a closure face on the inner component following the relative translational movement of the inner component.

In such a construction with translational and preferably linear relative movability, consequently, a possible construction of the switching valve is of such a type that a, for example, plate-like portion of the switching valve which forms the closure face can be pressed against a peripheral edge region of the fluid outlet in order to close it. This is a structurally very simple possibility for producing such a switching valve.

The discharge head may have an extraction valve at the other side of the switching valve. To this end, the discharge head has a separate piston type syringe or a different removal device which is adapted to the outer component and the extraction valve so that it opens the extraction valve by being placed against the outer component.

A discharge head having such an extraction valve allows a fluid charge to be introduced into the separate piston syringe mentioned or a different removal device in order to administer it therefrom to a child. The difficulty for independent removal for a child is thereby further increased. This is particularly applicable if the extraction valve is constructed in such a manner that it can only be opened mechanically by introducing the piston syringe but not by over-pressure.

The discharge head may have a diaphragm between an inlet side of the discharge head and the switching valve.

The diaphragm mentioned is particularly useful in order to prevent simple discharge of the fluid from being possible when the switching valve is open. The diaphragm may in particular damp dynamic pressure increases as a result of a shaking movement and thus prevent an outlet valve which opens in a pressure-dependent manner from opening as a result of a shaking movement brought about by a child to a sufficient extent to discharge fluid. The diaphragm may particularly be formed by a plate-like or bowl-like insert which is provided at the admission side of the discharge head. As a result of narrow channels in the edge region, the fluid can still be discharged in sufficient quantities when the fluid dispenser is used by an adult.

The inner component and the outer component may have designation means which indicate whether the inner component and the outer component are in the first relative position, wherein there is provided in particular in the outer component a recess, through which a locking marking on the inner component can be seen in the first relative position.

Alternatively or additionally, there may be provision for the outer component and housing portions adjoining in the direction of the fluid store to have a cross-sectional shape differing from the circular shape, for example, a slightly oval cross-sectional shape. In the first relative position, those cross-sectional shapes are then orientated in alignment with each other and, in the second relative position, rotated relative to each other so that the outer component protrudes partially. Thus, it can readily be seen whether the discharge head has been inadvertently left in the second relative position (open position).

In order to apply force to the outer component for the purpose of releasing the child-resistant mechanism, actuation faces may be provided on the outer component so as to be offset in a peripheral direction relative to the stop face. They are preferably made apparent by a ribbing or the like. The actuation faces are preferably offset by 90° relative to the stop face which is intended to be redirected.

The discharge head may have a cap or a measuring cup which can be positioned on the outer component in a blocking position and which is retained at that location in a non-positive or positive-locking manner.

That cap or measuring cup may have a recess, which extends through a recess of the outer housing and causes a peripheral seal at that location. That seal may be produced, for example, at a peripheral edge of the outer component or also on a portion of the outlet valve. The additional seal of that type described is particularly advantageous when using outlet valve members which are constructed integrally and so as to have a valve slot because they sometimes do not seal perfectly as a result of only slight pretensioning. Drying and crystallisation are prevented or reduced by the additional sealing location.

The inner component and the outer component may be provided integrally and the discharge head may comprise only those two components. In the case of construction with an outlet valve comprising resilient material, consequently, the discharge head may comprise in total only three members. Together with the fluid container, there is then produced a fluid dispenser comprising only four members or, in the case of an integral construction of the fluid container and the inner component, even only three members.

The fluid dispenser according to the invention has a fluid container and a discharge head.

The discharge head is constructed according to any one of the preceding descriptions.

The fluid container may be constructed in particular as a squeezable bottle, that is to say, for correct application of force for the purpose of reducing the inner volume. As already mentioned, such a squeezable bottle may be configured by wall thicknesses being adapted so that a child finds it difficult to compress them sufficiently.

The fluid container may be connected to the inner component integrally.

Instead, the fluid container and the inner component may have connection means, via which the inner component can be fixed on the fluid container. In this instance, conventional known connection means may be considered, such as, in particular threaded connections and snap-fit connections.

The fluid container may be filled with a pharmaceutical fluid, in particular with a cough syrup.

BRIEF DESCRIPTION OF THE DRAWINGS

Additional advantages and aspects of the invention will be appreciated from the claims and the following description of preferred embodiments of the invention which are explained below with reference to the Figures.

FIGS. 1 and 2 generally show a first embodiment of a fluid dispenser according to the invention in the closed and child-resistant state.

FIGS. 3 and 4 are two cross-sections through that first embodiment in the closed state and child-resistant state.

FIGS. 5 and 6 generally show the first embodiment in the open state.

FIGS. 7 and 8 show corresponding cross-sections in accordance with FIGS. 3 and 4 in the open state of the dispenser.

FIG. 9 is a general sectioned view of a second embodiment of a dispenser according to the invention.

FIG. 10 is a general sectioned view of a third embodiment of a dispenser according to the invention.

DETAILED DESCRIPTION OF THE EMBODIMENTS

Figure 11:
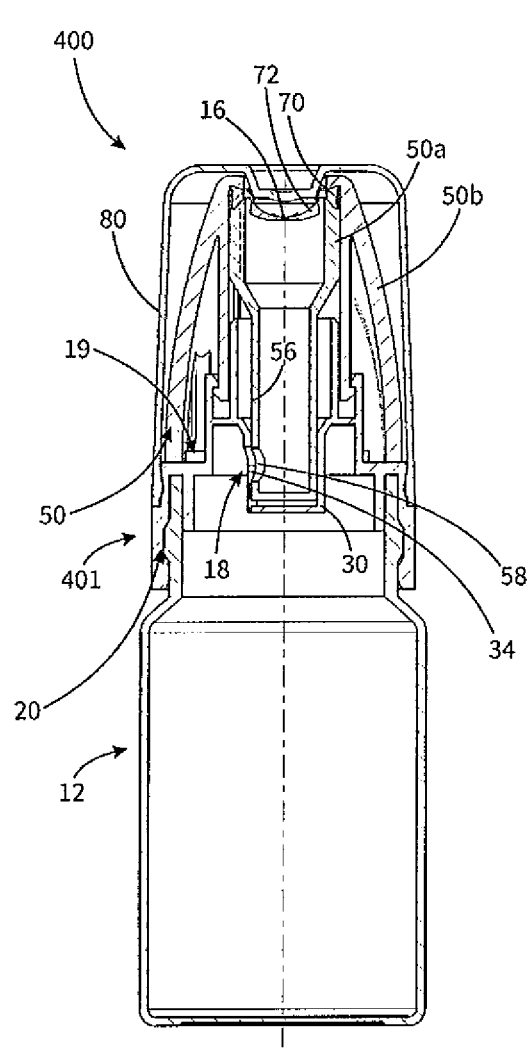
FIGS. 11 and 12 are a general sectioned view and a non-sectioned view of a fourth embodiment of a dispenser according to the invention.

FIGS. 1 to 8 show a first embodiment of a dispenser 100 according to the invention having a discharge head 101 according to the invention. FIGS. 1 to 4 show the state of the dispenser in the locked state and FIGS. 5 to 8 show the state of the dispenser ready for discharge.

With reference to FIGS. 1 to 4, there can be seen the fluid dispenser 100 which has a bottle-like fluid store 12 which is in the form of a squeezable bottle and which is consequently compressed in accordance with provisions to discharge fluid. In the state of FIGS. 1 to 4, a cap 80 which has in the region of a discharge opening 16 a recess 82, which will be explained in greater detail below, is positioned on the discharge head 101 of the fluid dispenser 100. That cap can also be used as a measuring cup in which the fluid is discharged in accordance with provisions and which preferably has a measurement scale. The cap can further effectively prevent the crystallisation of fluid residues at the other side of the discharge opening by means of an air-tight sealing location with respect to the outer component and provide a discharge prevention means.

The discharge head 101 which is covered by that cap 80 in the state of FIGS. 1 to 4 has two components which can be moved in relative terms with respect to each other and which in this instance are constructed integrally, but which could also comprise a plurality of partial components. An inner component 20 is engaged on the fluid store 12 by means of a snap-fit connection. To this end, the inner component 20 has two sleeve-like portions 22, 24 which are connected to each other via an end face 26 and which produce a fluid-tight connection to the bottle neck. An outer component 50 which is connected in a non-releasable manner to the inner component 20 is positioned on that inner component 20. The outer component 50 has a casing 51 which surrounds the inner component in a sleeve-like manner. The casing 51 merges into an upper covering face 60 which is provided centrally with a recess. There are provided at the inner side of the outer component 50 continuations 52, 54 which prevent together with retention portions 28 of the inner component 20 the outer component 50 from being pulled off the inner component 20, and which consequently produce the non-releasable action.

Starting from the end face 26, the inner component has an annular wall 30 which extends cylindrically upwards and the inner region of which is separated from the fluid container 12 by a partition wall 32 which is provided with a protrusion. Openings 34 are provided in the cylindrical wall 30. A cylindrical wall 56 of the outer component adjoins that cylindrical wall 30 of the inner component 20 at the outer side, which wall 56 extends downwards from the covering face 60 and which also has openings 58. The two walls 30, 56 with the openings 33, 58 thereof, respectively, form a switching valve 18 which can be switched by relative movement of the inner component 20 and the outer component 50.

In the closed state of FIG. 1, those openings 34, 58 are not arranged in alignment with each other, as can be seen in particular in FIG. 4. Fluid from the fluid store 12 therefore cannot reach the region above the partition wall 32. The switching valve 18 is closed.

The state of the fluid dispenser 100 in FIGS. 1 to 4 is the closed and locked state in which fluid cannot be discharged as a result of the arrangement of the openings 34, 58. As can be seen with reference to the non-sectioned FIG. 2, this state is illustrated on the dispenser in that a corresponding pictograph 42 can be seen through a recess 66 of the outer component.

The inner component 20 and the outer component 50 control, as a result of the relative arrangement thereof via the switching valve 18, the possibility of the flow of fluid into the region above the partition wall 32. For this purpose, they are in principle rotatable relative to each other about a rotation axis 1. However, there is provided a child-resistant mechanism which makes this rotational movement more difficult so that it is barely possible for a child to do. With reference to FIG. 3 which shows the plane of section indicated III in FIG. 1, that child-resistant mechanism is formed by cams 62 which are arranged in recesses of the inner component 20 delimited at both sides in a peripheral direction. A rotational movement of the outer component 50 with respect to the inner component 20 is not initially possible in the state illustrated in FIG. 3. The correct rotational movement of the outer component 50 in the clockwise direction is prevented by a stop face 40 of a cam 38 which is associated with the inner component 20. In the opposite direction, a cam 36 prevents the rotational movement.

In order to make the dispenser usable, first the cap 80, which has kept the outlet opening 16 securely closed until now together with the protrusion of the partition wall 32, has to be removed. Subsequently, a rotational movement of the outer component 50 with respect to the inner component 20 has to be carried out. However, this is not possible until, with reference to FIG. 3, two actuation faces 64 on the outer component 50 are pressed towards each other in the direction of the arrows 2. The outer component 50 is thereby deformed in the region of the outer casing 51 thereof and takes up a substantially elliptical form with respect to the cross-section. The cams 62 of the outer component 50 are thereby pressed away from each other in the direction of the arrows 4 and thus move out of engagement with respect to the cams 38 which are associated with the inner component. The outer component 50 can now be rotated relative to the inner component 20, in this instance through approximately 150° in the clockwise direction.

The state of FIGS. 5 to 8 is thereby produced. As can be seen with reference to FIG. 5, the openings 34 and 58 in the inner component 20 and in the outer component 50 are now arranged in alignment with each other. Consequently, fluid moves along the fluid path 6 from the fluid store 12 as far as the chamber above the partition wall 32. The dispenser is used in an inverted position in accordance with provisions so that the fluid automatically flows as far as this chamber. There is further needed an excess pressure which is brought about by compressing the fluid store 12. That excess pressure deforms a valve member 72, which closes the chamber mentioned and which is clamped by means of a fixing edge 70 between the inner component 20 and the outer component 50, and indirectly produces by means of that deformation a lifting of the outlet opening 16 from the partition wall 32 and opening of that outlet opening 16. Fluid is discharged.

As can be seen with reference to FIG. 6, that unlocked state which indirectly allows a discharge of fluid can also be readily identified by a pictograph 43. This also reminds the adult user to produce the locked state of the child-resistant mechanism again after use by rotating the outer component 50 back relative to the inner component 20. That production of the child-resistant state is made easier by a ramp-like side 41 on the cams 38.

FIG. 9 shows a second embodiment of a dispenser 200 according to the invention with a discharge head 201 according to the invention. Unlike the first fluid dispenser 100, an outlet valve 72 which opens in the event of excess pressure is not provided here. Consequently, a discharge is possible immediately in the inverted position. The chamber above the partition wall 32 consequently itself directly forms the outlet opening 16.

In the configuration according to FIG. 10, a practically structurally identical fluid dispenser 300 having a practically structurally identical discharge head 301 is again provided. The characteristic feature here is that, instead of the outlet valve 72 opening in the dispenser in the event of excess pressure, there is provided an extraction valve 76. That extraction valve 76 has inherent stability which does not allow any discharge of fluid at all under conventional actuation pressures of the fluid store 12. Instead, it requires an extraction syringe 90 having a tip 92, which is indicated in FIG. 10 and which allows the extraction valve 76 to be mechanically opened by introduction into the discharge head 301.

Figure 12:
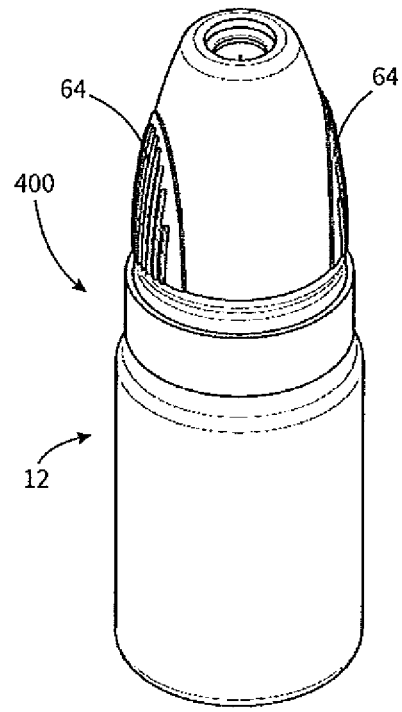
Figure 13:
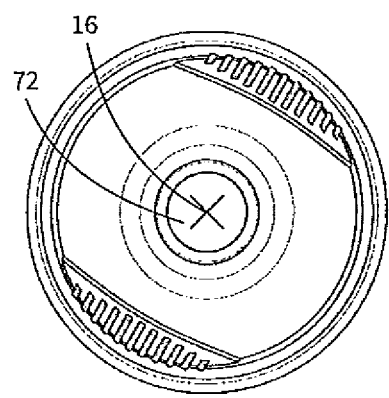
FIG. 13 is a plan view of the fourth embodiment.

FIGS. 11 to 13 show another embodiment of a fluid dispenser 400 according to the invention with a discharge head 401 according to the invention. The fluid dispenser 400 has a narrow construction. Unlike the construction of FIGS. 1 to 8, the outer component 50 is formed in this instance from two partial components 50a, 50b which are connected to each other in a rotationally secure manner with respect to each other and between which the fixing portion 70 of the outlet valve 72 which opens in a pressure-dependent manner is clamped. Unlike the construction of FIGS. 1 to 8, consequently, no friction is produced on the valve member 72 if the dispenser is moved into the state ready for discharge after the child-resistant mechanism has been released by compressing the actuation faces 64 and subsequent rotation of the outer component 50 relative to the inner component 20. Another difference with regard to the switching valve 18 is that in this construction of FIGS. 11 to 13 the cylindrical wall 56 of the outer component with the opening 58 provided therein is arranged at the inner side of the cylindrical wall 30 of the inner component 20 with openings 34.

Furthermore, the dispenser of FIGS. 11 to 13 can be compared functionally with the dispenser of FIGS. 1 to 8. In this instance, there is also a purely rotational movement between the outer component 50 and the inner component 20, by means of which movement the fluid path 6 is opened so that subsequently fluid can be discharged. That rotational movement is possible after compression of the actuation faces 64, by which a rotation prevention means acting as a child-resistant member is released in the region 19.

Figures 14, 15:
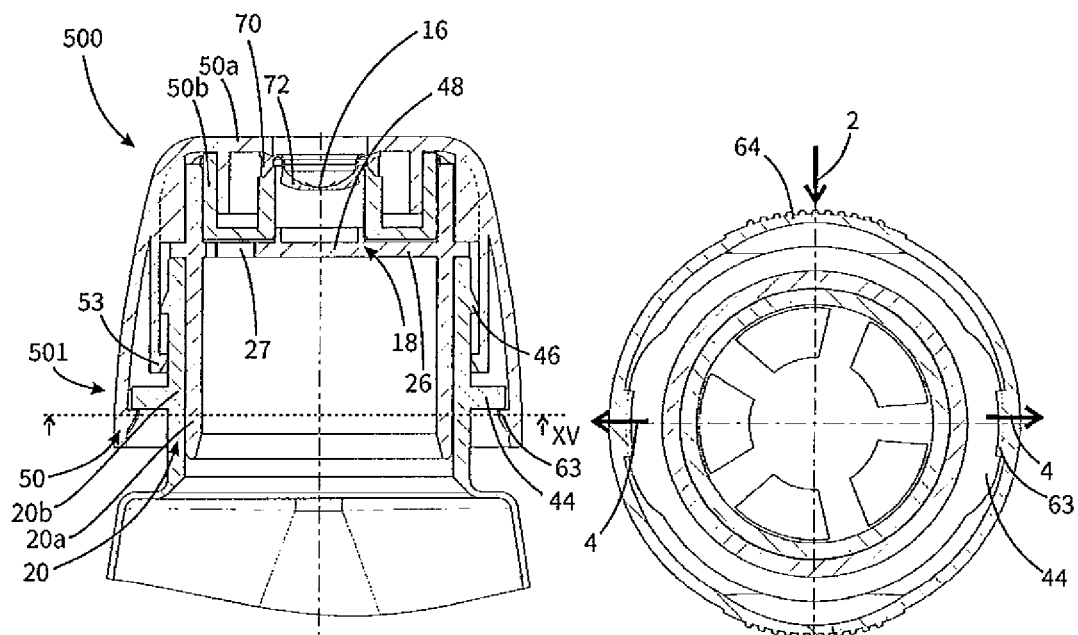
FIG. 14 is a lateral cross-section of the discharge head of a fifth embodiment of a fluid dispenser according to the invention in the closed state.
FIG. 15 is a cross-section with respect to the state of FIG. 14 in order to illustrate the child-resistant mechanism.
Figures 16, 17:
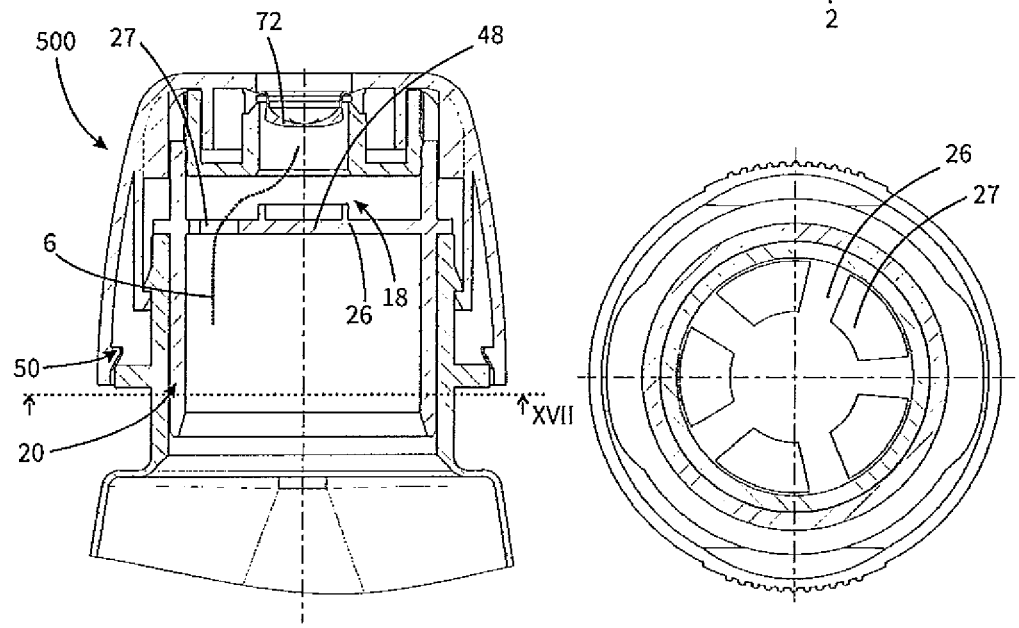
FIGS. 16 and 17 are a lateral cross-section and a cross-section of the fifth embodiment in the open state.

FIGS. 14 to 17 show another embodiment of a fluid dispenser 500 according to the invention having a discharge head 501 according to the invention. This discharge head 501 has a substantial functional difference with respect to the preceding embodiments because, although here an outer component 50 and an inner component 20 are also provided, here it is required to move the fluid dispenser 500 from a first relative position of FIG. 14 (closure position) into a second relative position of FIG. 16 (open position) via a translational movement in place of a rotational movement. The inner component 20 is in this instance formed by a specially adapted bottle neck 20b and an insert 20a which is fixed therein in a non-positive-locking manner. That insert 20a has an end face 26 having openings 27. The outer component 50, also comprising two partial components, that is to say, an outer element 50a and an insert 50b, is in principle movable in a translational manner with respect to that inner component 20. In this instance, the outer component 50 is also the carrier of an outlet valve 72 which opens in a pressure-dependent manner. A switching valve 18 which is formed by means of an annular edge on the end face 26 and a cylindrical channel inlet on the insert 50b, is connected upstream of that outlet valve. In the state of FIG. 14, that switching valve 18 is closed. At first, it is not possible to open the switching valve 18 by displacing the outer component 50 relative to the inner component 20 because stops 63 adjoin the inner side of the outer component 50 under a stop ring 44 of the inner component 20. Only by applying force to the actuation faces 64 in the direction of the arrows 2 indicated in FIG. 15 are the stops 63 redirected in the direction of the arrows 4 so that the outer component 50 can then be lifted. However, this movement is limited by stops 46, 53 so that the outer component 50 is again fitted to the inner component 20 in non-releasable manner. As soon as the outer component 50 has been lifted, there is again open a fluid path 6, through which the fluid can travel as far as the outlet valve 72 which opens in a pressure-dependent manner. If the outer component 50 is pressed down again after a discharge, the stops 63 automatically snap-fit again under the stop ring 44 so that there is again produced a child-resistant state which can be overcome again only by applying force to the actuation faces 64.

Figure 18:
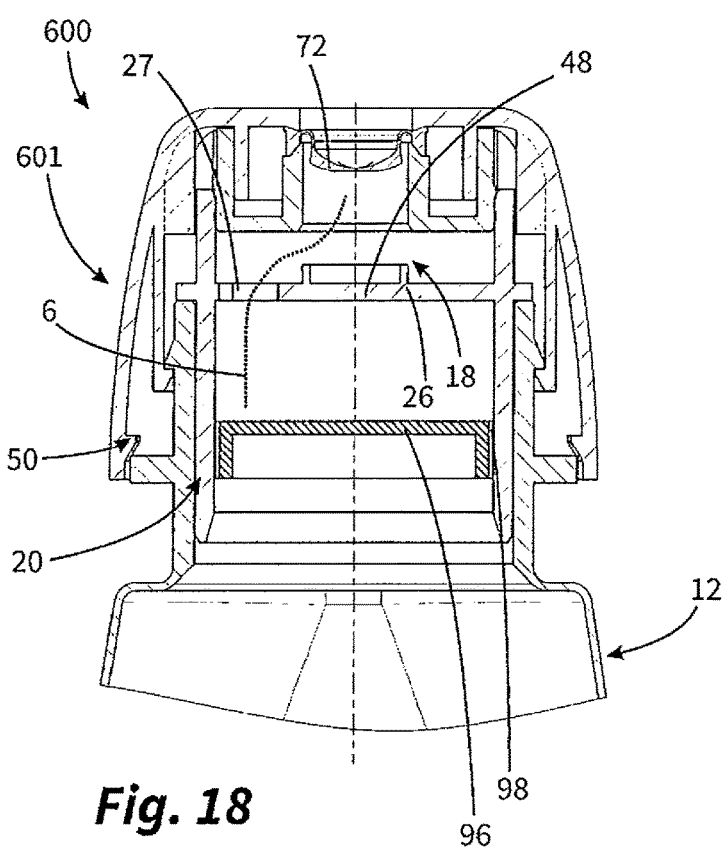
FIG. 18 shows the discharge head of a sixth embodiment of a fluid dispenser according to the invention.

The embodiment of FIG. 18 shows a discharge head 601 of a dispenser 600 which is substantially identical to the discharge head 501 of the preceding embodiment. The characteristic feature is in this instance that there is used a diaphragm 96 which partially blocks the flow of fluid from the fluid store in the direction of the outlet valve 72. However, through-channels 98, through which the fluid can pass, are provided at the outer side of the bowl-like diaphragm 96. The purpose of that diaphragm 96 is, in the event of the dispenser being inadvertently left open, still to make the discharge of fluid more difficult. The diaphragm 96 makes it possible for the outlet valve 72 to release fluid only by shaking the dispenser 600. The dynamic pressure in the fluid achieved by shaking does not reach the outlet valve 72. Only the application of force to the fluid store 12 in an inverted position is sufficient to open the outlet valve 72.

The invention claimed is:

1. A discharge head for a fluid dispenser having the following features:
    the discharge head is configured to be fitted to a fluid container;
    the discharge head has a discharge opening and a switching valve which, in a closed state, closes a fluid path from the fluid container to the discharge opening and, in an open state, opens the fluid path;
    the discharge head has an inner component configured to be fixedly connected to the fluid container;
    the discharge head has an outer component which is movable with respect to the inner component and which is connected to the inner component in a non-separable manner, wherein the outer component can be moved relative to the inner component between a first relative position and a second relative position;
    the switching valve can be opened and closed by a relative movement of the outer component with respect to the inner component, wherein the switching valve is closed in the first relative position and is open in the second relative position;
    the inner component and the outer component can be locked in the first relative position by a child-resistant mechanism which acts in a positive-locking manner and which can be switched over repeatedly between a locking position and a release position, wherein a relative displacement of the outer component from the first relative position into the second relative position is prevented in the locking position; and
    the discharge head has an outlet valve which opens in a pressure-dependent manner in case of inner pressure which is higher than ambient pressure downstream of the switching valve.

2. The discharge head according to claim 1, having at least one of the following features:
    the outer component is rotatable relative to the inner component between the first relative position and the second relative position about a rotation axis; and/or
    the outer component is displaceable relative to the inner component in a translational manner between the first relative position and the second relative position.

3. The discharge head according to claim 1, having the following features:
    the outlet valve is formed by a resiliently redirectable valve component, in which the discharge opening is provided and is opened by the valve component being deformed in case of fluid pressure being applied; and
    the valve component has at an outer side a peripheral fixing portion which is fixed to the inner component or the outer component, or which is fixed between the inner component and the outer component.

4. The discharge head according to claim 1, having the following features:
    the child resistant mechanism has on the inner component and the outer component stop faces which prevent a rotational and/or a translational movement starting from the first relative position and which can be uncoupled from each other by radial displacement of one of the stop faces.

5. The discharge head according to claim 4, having the following feature:
   the outer component is deformable in the first relative position with respect to the inner component by manual application of force so that the stop face on the outer component moves out of engagement with the stop face on the inner component.

6. The discharge head according to claim 1, having the following features:
   the outer component and the inner component are fitted to each other in a rotationally movable manner; and
   the switching valve has a radially orientated fluid outlet in the inner component and a radially orientated fluid outlet in the outer component, wherein in the first relative position the fluid outlets are offset relative to each other in a peripheral direction so that the switching valve is closed, and wherein in the second relative position the fluid outlets are aligned with each other so that the switching valve is open.

7. A fluid dispenser comprising a fluid container and the discharge head constructed according to claim 1.

8. The fluid dispenser according to claim 7, having at least one of the following features:
   the fluid container is connected to the inner component integrally or the fluid container and the inner component have a connection arrangement, via which the inner component can be fixed on the fluid container; and/or
   the fluid container is filled with a pharmaceutical fluid.

9. A discharge head for a fluid dispenser having the following features:
   the discharge head is configured to be fitted to a fluid container;
   the discharge head has a discharge opening and a switching valve which, in a closed state, closes a fluid path from the fluid container to the discharge opening and, in an open state, opens the fluid path;
   the discharge head has an inner component configured to be fixedly connected to the fluid container;
   the discharge head has an outer component which is movable with respect to the inner component and which is connected to the inner component in a non-separable manner, wherein the outer component can be moved relative to the inner component between a first relative position and a second relative position;
   the switching valve can be opened and closed by a relative movement of the outer component with respect to the inner component, wherein the switching valve is closed in the first relative position and is open in the second relative position;
   the inner component and the outer component can be locked in the first relative position by a child-resistant mechanism which acts in a positive-locking manner and which can be switched over repeatedly between a locking position and a release position, wherein a relative displacement of the outer component from the first relative position into the second relative position is prevented in the locking position;
   the outer component and the inner component are fitted to each other in a translationally movable manner in a relative movement direction; and
   the switching valve has a fluid passage in the inner component which can be opened or closed by a closure face on the outer component following a relative translational movement of the outer component in relation to the inner component, or the switching valve has a fluid passage in the outer component which can be opened or closed by a closure face on the inner component following a translational movement of the outer component in relation to the inner component.

10. A discharge head for a fluid dispenser having the following features:
    the discharge head is configured to be fitted to a fluid container;
    the discharge head has a discharge opening and a switching valve which, in a closed state, closes a fluid path from the fluid container to the discharge opening and, in an open state, opens the fluid path;
    the discharge head has an inner component configured to be fixedly connected to the fluid container;
    the discharge head has an outer component which is movable with respect to the inner component and which is connected to the inner component in a non-separable manner, wherein the outer component can be moved relative to the inner component between a first relative position and a second relative position;
    the switching valve can be opened and closed by a relative movement of the outer component with respect to the inner component, wherein the switching valve is closed in the first relative position and is open in the second relative position;
    the inner component and the outer component can be locked in the first relative position by a child-resistant mechanism which acts in a positive-locking manner and which can be switched over repeatedly between a locking position and a release position, wherein a relative displacement of the outer component from the first relative position into the second relative position is prevented in the locking position; and
    the discharge head has an extraction valve downstream of the switching valve.

11. The discharge head according to claim 10, wherein the discharge head has a separate piston syringe which is adapted to the outer component and the extraction valve so that the piston syringe opens the extraction valve by being placed against the outer component.

12. A discharge head for a fluid dispenser having the following features:
    the discharge head is configured to be fitted to a fluid container;
    the discharge head has a discharge opening and a switching valve which, in a closed state, closes a fluid path from the fluid container to the discharge opening and, in an open state, opens the fluid path;
    the discharge head has an inner component configured to be fixedly connected to the fluid container;
    the discharge head has an outer component which is movable with respect to the inner component and which is connected to the inner component in a non-separable manner, wherein the outer component can be moved relative to the inner component between a first relative position and a second relative position;
    the switching valve can be opened and closed by a relative movement of the outer component with respect to the inner component, wherein the switching valve is closed in the first relative position and is open in the second relative position;
    the inner component and the outer component can be locked in the first relative position by a child-resistant mechanism which acts in a positive-locking manner and which can be switched over repeatedly between a locking position and a release position, wherein a relative displacement of the outer component from the first relative position into the second relative position is prevented in the locking position; and the discharge head has a diaphragm between an inlet side of the discharge head and the switching valve.

13. A discharge head for a fluid dispenser having the following features:

the discharge head is configured to be fitted to a fluid container;

the discharge head has a discharge opening and a switching valve which, in a closed state, closes a fluid path from the fluid container to the discharge opening and, in an open state, opens the fluid path;

the discharge head has an inner component configured to be fixedly connected to the fluid container;

the discharge head has an outer component which is movable with respect to the inner component and which is connected to the inner component in a non-separable manner, wherein the outer component can be moved relative to the inner component between a first relative position and a second relative position;

the switching valve can be opened and closed by a relative movement of the outer component with respect to the inner component, wherein the switching valve is closed in the first relative position and is open in the second relative position;

the inner component and the outer component can be locked in the first relative position by a child-resistant mechanism which acts in a positive-locking manner and which can be switched over repeatedly between a locking position and a release position, wherein a relative displacement of the outer component from the first relative position into the second relative position is prevented in the locking position;

the discharge head further having at least one of the following features:

the inner component and the outer component have an arrangement which indicates whether the inner component and the outer component are in the first relative position, the arrangement including a recess provided in the outer component and a locking marking on the inner component which can be seen through the recess in the first relative position; and/or in order to apply force to the outer component for a purpose of releasing the child-resistant mechanism, actuation faces are provided on the outer component so as to be offset in a peripheral direction relative to a stop face which forms part of the child-resistant mechanism; and/or the outer component has an opening which is aligned with an axis of the discharge head and inside which the discharge opening is provided; and/or the discharge head has a cap or a measuring cup which can be positioned on the outer component in a blocking position and which is retained at the blocking position in a non-positive or positive-locking manner; and/or the cap or measuring cup has a recess, which extends through a recess of the outer component and forms a peripheral seal with the outer component; and/or the inner component and the outer component are provided integrally and the discharge head comprises only the inner and outer components.

* * * * *